(12) United States Patent
Tu et al.

(10) Patent No.: US 12,517,249 B2
(45) Date of Patent: Jan. 6, 2026

(54) UTILIZING LIGHT DETECTION AND RANGING SENSORS FOR VEHICLE-TO-EVERYTHING COMMUNICATIONS

(71) Applicant: GM Cruise Holdings LLC, San Francisco, CA (US)

(72) Inventors: Hongen Tu, San Francisco, CA (US); Ryan Suess, Seattle, WA (US); Min Wang, Los Altos Hills, CA (US); Alexander Lesnick, Dublin, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 967 days.

(21) Appl. No.: 17/552,930

(22) Filed: Dec. 16, 2021

(65) Prior Publication Data

US 2023/0194717 A1    Jun. 22, 2023

(51) Int. Cl.
*G01S 17/89* (2020.01)
*G06V 20/56* (2022.01)
(Continued)

(52) U.S. Cl.
CPC .............. *G01S 17/89* (2013.01); *G06V 20/56* (2022.01); *H04W 4/40* (2018.02); *H04W 4/44* (2018.02); *H04W 4/46* (2018.02)

(58) Field of Classification Search
CPC ...... G01S 17/89; G01S 7/4816; G01S 7/4863; G01S 17/894; G01S 17/931; G01S 7/006;
(Continued)

(56) References Cited

U.S. PATENT DOCUMENTS 10,931,374 B1    2/2021  Sleator
2015/0042168 A1  2/2015  Widmer
(Continued)

FOREIGN PATENT DOCUMENTS

DE    102018217944 A1 *  4/2020
EP       3792128 A1       3/2021

OTHER PUBLICATIONS

European Search Report dated May 15, 2023; Application No. 22210567.8.

(Continued)

*Primary Examiner* — Michael J Zanelli
(74) *Attorney, Agent, or Firm* — Honigman LLP; Matthew H. Szalach; Jonathan P. O'Brien

(57) ABSTRACT

Aspects of the disclosed technology provide solutions for enabling vehicle-to-vehicle communications and in particular, for providing optical communication capabilities using Light Detection and Ranging (LiDAR) sensors. In some aspects, the disclosed technology encompasses solutions for utilizing LiDAR sensors to engage in Vehicle-to-Everything (V2X) communications. A LiDAR sensor of the disclosed technology can include a processing unit, an image-sensor coupled to the processing unit, and a first array of photodetectors coupled to the processing unit, wherein the first array of photodetectors is disposed in an optical field of the optical lens and coupled to a top-edge of the image sensor, and wherein an integration rate for light signals received by the first array of photodetectors is faster than an integration rate for light signals received by the image-sensor.

20 Claims, 9 Drawing Sheets

(51) Int. Cl.
*H04W 4/40* (2018.01)
*H04W 4/44* (2018.01)
*H04W 4/46* (2018.01)

(58) Field of Classification Search
CPC .......... G06V 20/56; H04W 4/40; H04W 4/44; H04W 4/46; H04B 10/114
See application file for complete search history.

(56) References Cited

U.S. PATENT DOCUMENTS

| | | |
|---|---|---|
| 2018/0188359 A1* | 7/2018 | Droz ................. G01S 7/497 |
| 2019/0227175 A1 | 7/2019 | Steinberg et al. |
| 2019/0323855 A1 | 10/2019 | Mahler et al. |
| 2020/0041609 A1* | 2/2020 | Ames ............ H04B 10/1143 |
| 2020/0280829 A1* | 9/2020 | Benefield .............. H04W 4/46 |
| 2021/0006332 A1* | 1/2021 | Pandit ................. H04B 10/11 |
| 2021/0111811 A1 | 4/2021 | Leefer |
| 2022/0176839 A1 | 6/2022 | Lieberman |
| 2022/0410876 A1* | 12/2022 | Gunnarsson .......... B60W 50/14 |
| 2023/0038722 A1 | 2/2023 | Kumar |
| 2023/0347758 A1 | 11/2023 | John |

OTHER PUBLICATIONS

Chowdhury et al, A Comparative Survey of Optical Wireless Technologies, Architectures and Applications; IEEE Access; Mar. 13, 2018, vol. 6, pp. 9819-9840.

* cited by examiner

UTILIZING LIGHT DETECTION AND RANGING SENSORS FOR VEHICLE-TO-EVERYTHING COMMUNICATIONS

TECHNICAL FIELD

Aspects of the disclosed technology provide solutions for enabling vehicle-to-vehicle communications and in particular, for providing optical communication capabilities using Light Detection and Ranging (LiDAR) sensors and expanding LiDAR sensors as communication devices.

BACKGROUND

An autonomous vehicle is a motorized vehicle that can navigate without a human driver. An exemplary autonomous vehicle includes a plurality of sensor systems, such as, but not limited to, a camera sensor system, a LiDAR sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system. In some applications, these systems utilize a perception system (or perception stack), that implements various computing vision techniques to reason about the surrounding environment.

BRIEF SUMMARY

In one aspect, a Light Detection and Ranging (LiDAR) system may include a processing unit, and an image-sensor coupled to the processing unit, the image-sensor disposed in an optical field of an optical lens. The LiDAR system may also include a first array of photodetectors coupled to the processing unit. The first array of photodetectors is disposed in the optical field of the optical lens and coupled to a top-edge of the image sensor. An integration rate for light signals received by the first array of photodetectors is faster than an integration rate for light signals received by the image-sensor.

In another aspect, an autonomous vehicle (AV) may include a Light Detection and Ranging (LiDAR) sensor mounted to at least one surface of the AV, where the LiDAR sensor is configured for Vehicle-to-Everything (V2X) communications with at least one other vehicle or an infrastructure. The LiDAR sensor may include a processing unit and an image-sensor coupled to the processing unit, the image-sensor disposed in an optical field of an optical lens. The LiDAR sensor may also include a first array of photodetectors coupled to the processing unit, where the first array of photodetectors is disposed in the optical field of the optical lens and coupled to a top-edge of the image sensor, and where an integration rate for light signals received by the first array of photodetectors is faster than an integration rate for light signals received by the image-sensor.

In a further aspect, a communication system may include a first autonomous vehicle (AV) comprising a first Light Detection and Ranging (LiDAR) sensor configured for optical V2X communications. The communication system may also include a second autonomous vehicle (AV) comprising a second Light Detection and Ranging (LiDAR) sensor configured for optical V2X communications, where the first AV is configured to receive one or more optical V2X messages from the second AV via a first array of photodetectors disposed within the first LiDAR sensor.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE FIGURES

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
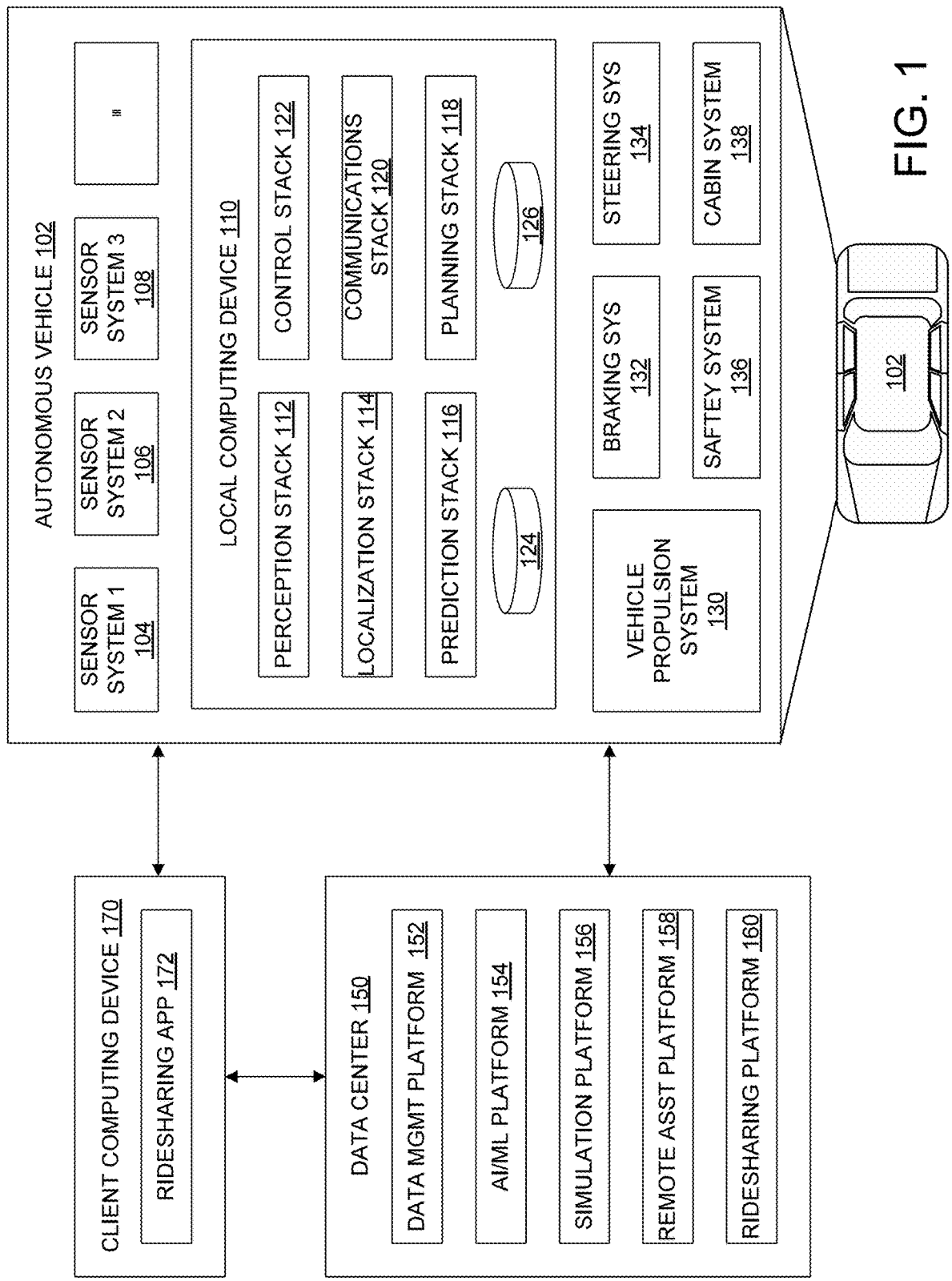
FIG. 1 illustrates an example of a system for managing one or more Autonomous Vehicles (AVs) in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form to facilitate describing one or more aspects. Further, it is to be understood that functionality that is described as being carried out by certain system components may be performed by more or fewer components than shown.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

In LiDAR sensor deployments, such as those frequently used in autonomous vehicle (AV) applications, ranging measurements consume a relatively small percentage of the total duty-cycles available for sensor operations. By way of example, image sensors in some LiDAR sensor applications may consume approximately 5% of the total available duty cycles.

Aspects of the disclosed technology provide solutions for improving vehicle-to-vehicle communications by utilizing LiDAR sensors to perform optical communications. In some aspects, vehicle-mounted LiDAR sensors can be modified or repurposed, for example, so that they can engage in high-bandwidth optical communications with similarly configured LiDAR sensors, e.g., on other vehicles. In some aspects, optical communications can be enabled by modifying an image sensor of the LiDAR sensor to include an array of photodetectors, for example, that are configured for high-bandwidth optical communications. By enabling high-bandwidth optical communications between vehicles, in some instances Vehicle-to-Everything (V2X) communications or Vehicle-to-Vehicle (V2V) communications can be optically transmitted.

In practice, the use of LiDAR sensors for optical communications can be dependent upon an amount or proportion of duty cycles that are dedicated to normal sensor operations, such as range-finding measurements performed by the LiDAR sensor. As such, some aspects of the disclosure provide solutions for utilizing inactive time (or unused LiDAR duty cycles) for other sensing and communication purposes. By way of example, duty cycle allocations can be engineered or configured to reduce or increase the time used for range measurement.

In some applications, the LiDAR system can also communicate with adjacent photosensors and establish vehicle-to-vehicle (V2V) or vehicle-to-everything (V2X) communications. By enabling V2X communications using optical communication between vehicles, the LiDARs on the AVs can transmit information to improve the overall safety of the AV operations. The transmitted information may include vehicle speed, Global Positioning System (GPS) location, occupancy, among others. The optical communications may be used to transmit critical information between vehicles, such as metadata that communicates object locations from one AV to another AV, thereby expanding the effective sensor coverage beyond what is possible with a single AV.

The LiDAR system and methods can establish direct short-range communications by utilizing existing optical components. Timing information and other critical parameters can be exchanged and allowing more sensors to be utilized simultaneously without interference from each other.

FIG. 1 illustrates an example of an AV management system 100. One of the ordinary skills in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LiDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LiDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LiDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LiDAR, RADAR, ultrasonic sensors, the HD geospatial database 122, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LiDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., the direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left-turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LiDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the cartography platform, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the cartography platform, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

The sensor system 106 (e.g. LiDAR) on the AV 102 can be modified to be the disclosed LiDAR system as described below. The disclosed LiDAR systems utilize a variety of optical transmit and receive elements, such as an array of photodetectors and laser diodes, that are configured for transmitting optical signals that carry encoded digital data streams. For example, in some implementations the disclosed LiDAR sensor system uses an optical data stream for V2V or V2X communication. The disclosed LiDAR sensor system uses the photosensor to receive light signals in between usage for the image sensor.

The disclosed LiDAR systems have several benefits including increasing the usefulness of the LiDAR sensors for data communication, and reducing cost for communication between vehicles compared to using WiFi.

In one aspect, the disclosed system and method can establish communications between two autonomous vehicles (AVs) equipped with LiDAR sensors or LiDARs, e.g. flash LiDARs. An adjacent vehicle can broadcast sensing metadata in a blind spot and can transmit optical data to other AVs, which may effectively expand the range of the LiDARs to fleets of surrounding AVs.

Figure 2A:
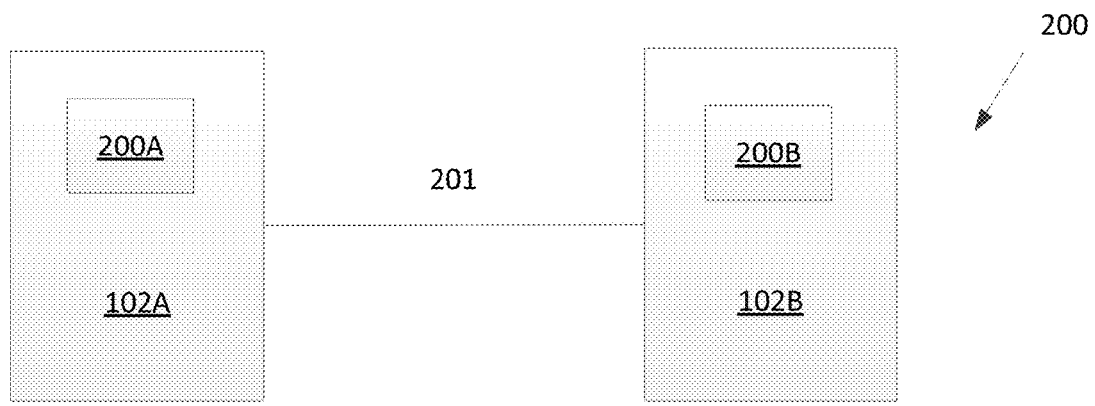
FIG. 2A is a system diagram of an example LiDAR sensor that has been configured for V2X communications, in accordance with one aspect of the present technology.

FIG. 2A is a system diagram of a LiDAR system including an image sensor and an array of photodetectors for uses in both distance detection and data communication in accordance with some aspects of the present technology. As illustrated in FIG. 2A, a sensor system 200 includes an example LiDAR transmitting system 200A or first LiDAR sensor 200A on a first AV 102A and an example LiDAR receiving system 200B or second LiDAR sensor 200B on a second AV 102B adjacent to the first AV 102A. The sensor system 200 can be used for both LiDAR sensing and data communication. For example, sensor system 200 can be a camera-based LiDAR system, which has an image sensor that is configured to sense light, and to determine object range information, for example, on a per-pixel basis. The sensor system is also referred to as a range camera. In some aspects, the LiDAR transmitting system 200A is configured for optical data communication 201 with the receiving system 200B, via laser signals emitted from a light source (e.g. laser diodes) in the transmitting system 200A. To receive optical communications, the laser signals can be received by an array of photodetectors in the receiving system 200B.

Figure 2B:
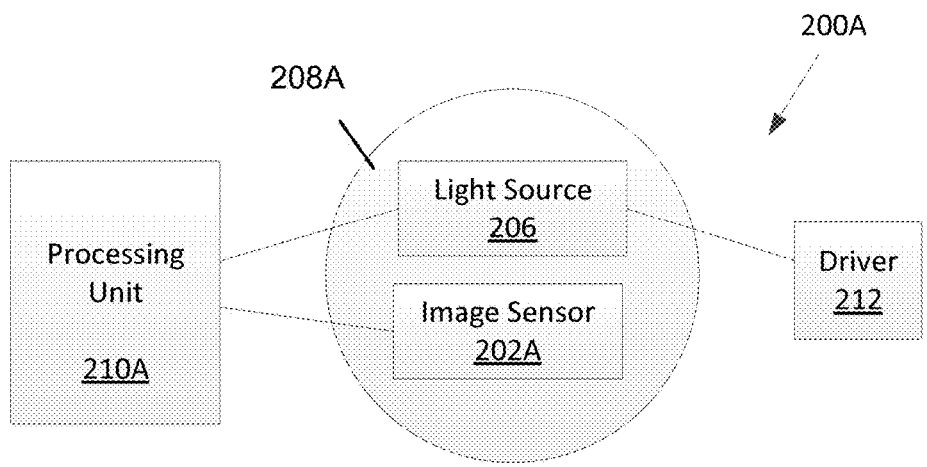
FIG. 2B is a system diagram illustrating an example LiDAR transmitting system of FIG. 2A in accordance with one aspect of the present technology.

FIG. 2B is a system diagram illustrating the LiDAR transmitting system of FIG. 2A in accordance with one aspect of the present technology. As illustrated in FIG. 2B, the LiDAR transmitting system 200A may include an image sensor 202A. The image sensor 202A may be a flash LiDAR sensor or a time-of-flight LiDAR sensor. The image sensor 202A may include a focal plane array of pixels.

Figure 6A:
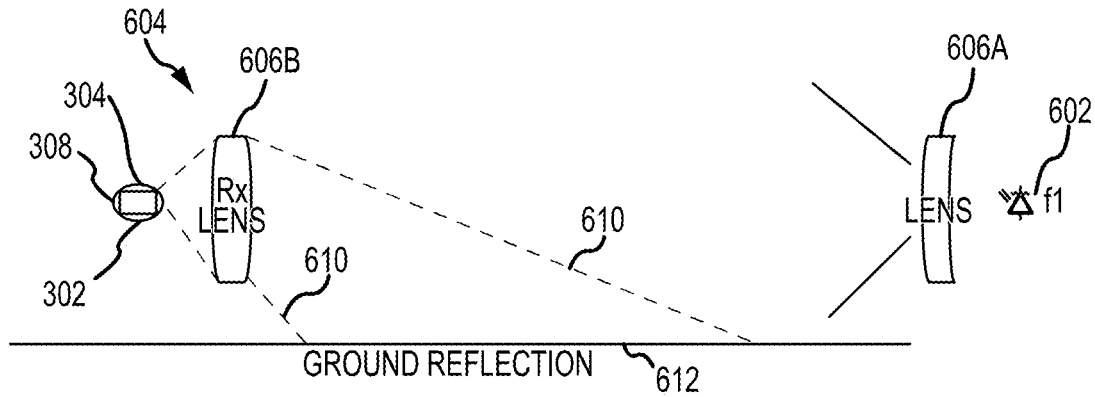
FIG. 6A is a diagram illustrating an array of photodetectors positioned for collecting reflections from the ground in accordance with some aspects of the present technology.
Figure 6B:
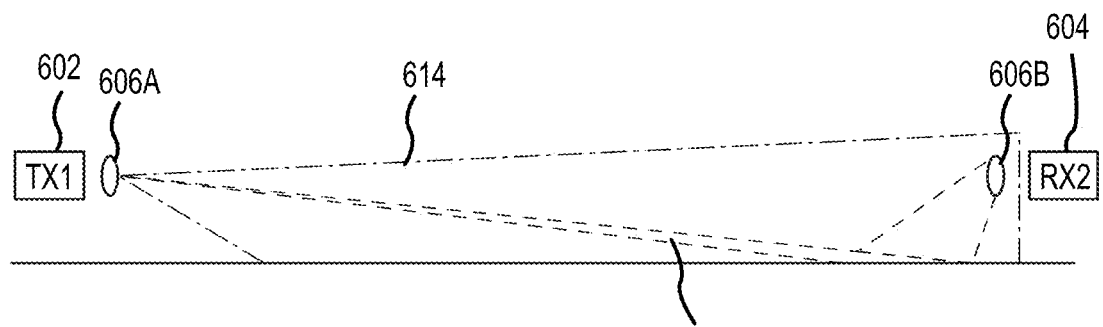
FIG. 6B is a diagram illustrating light rays for ranging measurements and free-space optical (FSO) communications in accordance with some aspects of the present technology.
Figure 7A:
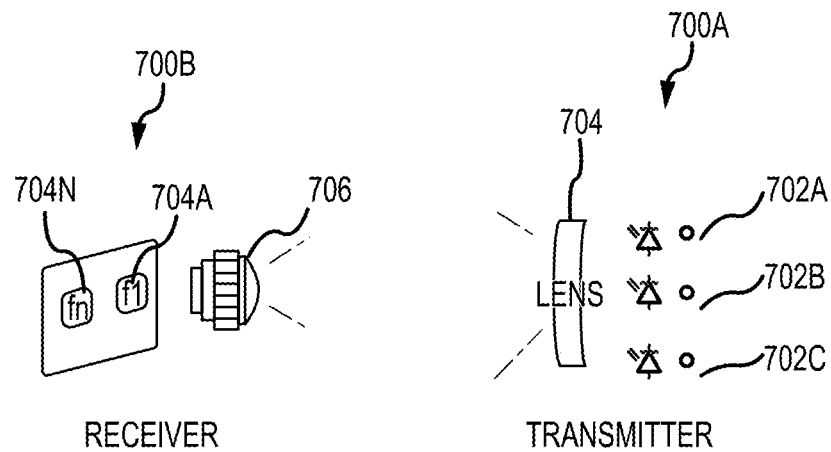
FIG. 7A is a diagram illustrating a LiDAR system including the array of photodetectors configured to operate at three wavelengths simultaneously in accordance with some aspects of the present technology.
Figure 7B:
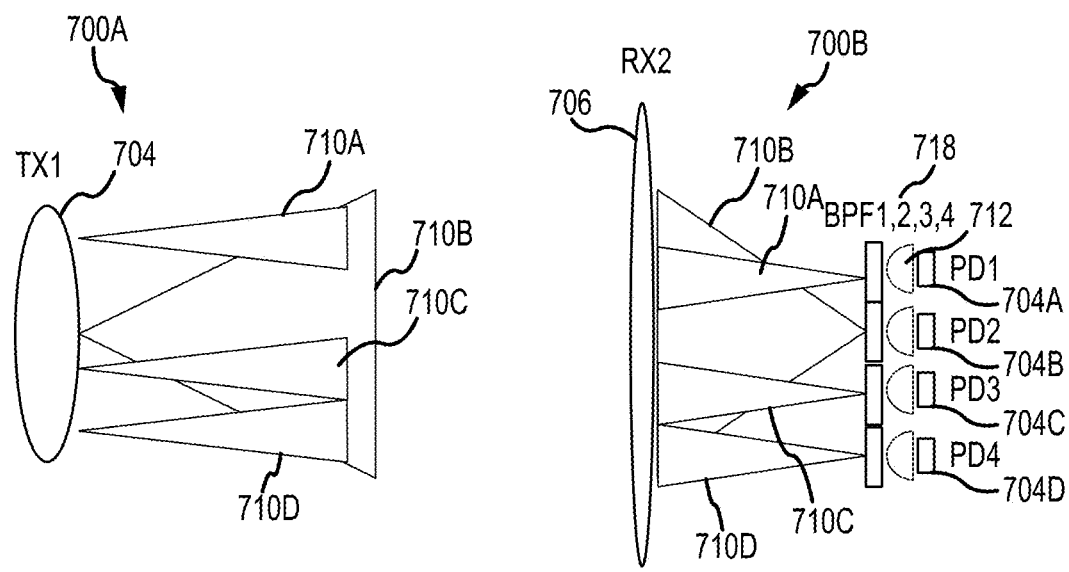
FIG. 7B is a top-down view of lens, photodetector, and focal plane stackup illustrating different light beams for ranging measurements and FSO communication in accordance with some aspects of the present technology.

The LiDAR transmitting system 200A may also include an optical lens which forms an optical field 208A. The optical lens can gather reflected light from the ground, and focus the light onto the image sensor 202A, as illustrated in FIG. 6A and discussed later. The image sensor 202A may be positioned within the optical field 208A formed by the optical lens. The light for ranging detection and the light for free-space optical (FSO) communication are focused to different parts of a focal plane, which are illustrated in FIG. 6B and FIG. 7B and described in details.

The FSO communication may happen during a large portion of the duty cycle (e.g. 95%) when the system is not making a range measurement (e.g. 5% of time).

The LiDAR transmitting system 200A may also include a light source 206. In some variations, the light source 206 may be a pulsed laser diode or light-emitting diode (LED). The light source 206 may emit one or more lasers at different wavelengths. The light source 206 may be used for illuminating a scene. The light source 206 may be switched on for a very short time to generate a light pulse for illuminating the scene. The light pulse from the light source is reflected by an object in a scene. The lens gathers the reflected lights from the objects and images the reflected lights onto the sensor or an array of pixels. Each pixel of the image sensor measures the time the light travels from the light source 206 (e.g. laser or LED) to the object and back to the focal plane array. Depending upon the distances from the object, the incoming light experiences a delay.

In some variations, the light source 206 may include a modulator coupled to the laser diode or LED. For radio-frequency (RF)-modulated light sources with phase detector imagers, the light can be modulated with high-speeds up to 100 MHz, such as laser diode or LED.

In some variations, the light source 206 may use infrared light to make the illumination unobtrusive.

The LiDAR transmitting system 200A may also include a processing unit 210A coupled to the light source 206 and a driving unit or driver 212A coupled to the light source 206. The processing unit 210A is configured to encode Vehicle-to-Everything (V2X) communications for transmission via the light-source 206.

The processing unit 210A may be used for computation. The distances from the objects can be directly calculated in the sensor system 200. As an example, if the signals between the light source 206 and the image sensor 202A shift by 10 picoseconds, the distance may change by 1.5 mm.

The LiDAR transmitting system 200A may also include an encoder. Many fundamental digital encoding techniques can be adopted and implemented as an optical pipeline. The technique uses a photon detector and relies on optical pulses and decodes the optical pulses as binary 1 and 0. A more advanced encoding concept can be adopted as well, similar to that used in ultra-wideband (UWB) by encoding its amplitude and/or by using orthogonal pulses. The UWB is a radio-based communication technology for short-range use and fast and stable transmission of data.

The sensor system 200 may also include driver electronics 212A configured to control the light source 206, and/or the image sensor 202A.

The sensor system 200 may also include analog mixer circuits to handle encoding/decoding and directly tied to field-programmable gate array (FPGA) to handle the reception/processing of the encoded optical signals. The FPGA may have additional circuitry added to inject control over the time-of-flight (ToF) laser pulses and thus establish both transmission and reception.

In some aspects, the LiDAR system may be a flash LiDAR, which can transmit and receive optical signals or emit and detect light over a wide range of angles (e.g. field of view), which makes it easier to meet the optical alignment requirements for communications. The image sensor 202A can be a time-of-flight (ToF) camera sensor that can measure the depths of the objects in the scene by illuminating the scene with a controlled laser or LED source, and then analyzing the reflected light. ToF is a highly accurate distance mapping and 3D imaging technology. In some aspects, ToF image sensors can be utilized to emit a very short infrared light pulse and each pixel of the camera sensor measures the return time. The ToF image sensor may also be referred to as a ToF flash LiDAR camera, which can measure the distances within an entire scene in a single shot. The distance between the image sensor and an object is measured based on the time difference between the emission of a signal and its return to the image sensor, after being reflected by an object.

The ToF flash LiDAR camera does not scan. Instead, the ToF flash LiDAR camera captures a scene with a single light pulse, which is referred to as a flash, as opposed to point-by-point with a rotating laser beam. The ToF flash LiDAR camera captures the scene in three dimensions.

The ToF flash LiDAR cameras or sensors can achieve sub-millimeter depth resolution. When a short laser pulse illuminates a scene, the camera opens its high-speed shutter for a few hundred picoseconds. The 3D distances can be calculated from the two-dimensional (2D) image frames which can be gathered with an increasing delay between the laser pulse and the shutter opening. Many ToF flash LiDAR sensors may also use periodic waveforms and detect the phase delay between transmitted and received signals.

The disclosure relates to LiDAR-to-LiDAR communication, where the LiDARs are set to an operating condition such that the LiDARs can communicate with each other. The flash LiDAR can sense its surroundings via a ToF sensing mechanism. A significant drawback of the flash LiDAR system is that multiple sensors of the same type may interfere with each other. To address the issue with LiDAR-to-LiDAR interference, the LiDARs are set to another operating condition such that the LiDARs can avoid each other (e.g. interference mitigation).

Figure 2C:
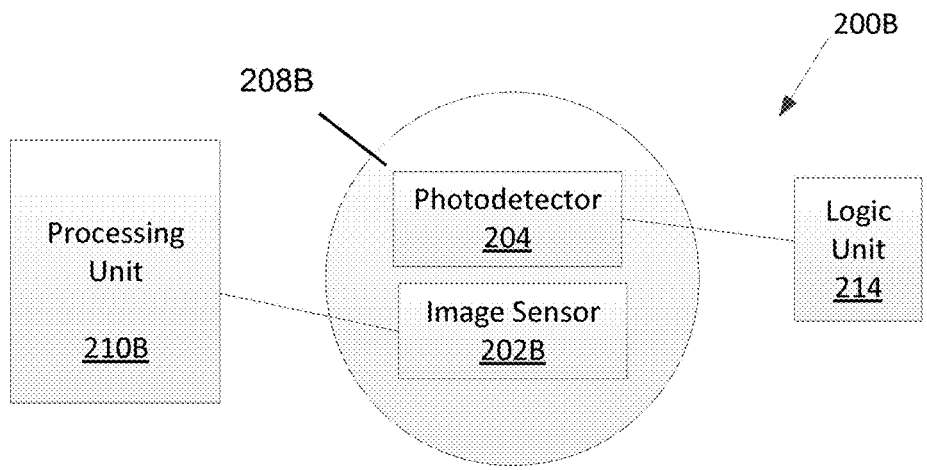
FIG. 2C is a system diagram illustrating an example LiDAR receiving system of FIG. 2A in accordance with one aspect of the present technology.

FIG. 2C is a system diagram illustrating the LiDAR receiving system of FIG. 2A in accordance with one aspect of the present technology. The LiDAR receiving system 200B or second LiDAR sensor 200B is on the second vehicle 102B adjacent to the first vehicle 102A. The LiDAR receiving system 200B may include an image sensor 202B and an array of photodetectors 204. The photodetectors 204 may also be referred to as photosensors, which can receive lights and convert into electric signals. The image sensor 202B may be a flash LiDAR sensor or a time-of-flight LiDAR sensor. The image sensor 202B may include a focal plane array of pixels.

The image sensor 202B may have a low bandwidth up to 1 kHz, while the array of photodetectors 204 may have a bandwidth ranging from 1 MHz to 1 GHz. An integration rate for light signals received by the first array of photodetectors is faster than an integration rate for light signals received by the image-sensor. Thus, the array of photodetectors may also be referred to high-speed photosensors.

The LiDAR transmitting system 200B may also include an optical lens. The image sensor 202B may be positioned within the optical field 208B formed by the optical lens.

The array of photodetectors 204 may be positioned next to the image sensor 202B positioned within the optical field 208B formed by the optical lens. The image sensor 202B has a low bandwidth up to 1 kHz and the array of photodetectors 204 has a bandwidth ranging from MHz to GHz. The second LiDAR sensor 200B is operated as a receiver to communicate with the first LiDAR sensor 200A. The processing unit 210B may be configured to decode Vehicle-to-Everything (V2X) communications received via the array of photodetectors 204.

The processing unit 210B may be configured to collect the frame data from the image sensor 202B and data from the array of photodetectors 204, perform the integration of the frame data from the image sensor 202B and the data from array of photodetectors 204, calculate intensities and phase shifts, and output results.

The LiDAR receiving system 200B or sensor system 200B may also include a logic unit 214 coupled to the array of photodetectors 204 on the second vehicle 102B. The LiDAR receiving system 200B may also include a second processing unit 210B coupled to the array of photodetectors 204 on the second vehicle 102B.

The LiDAR receiving system 200B may also include an optical band-pass filter that may pass the light with the same wavelength as the light source 206. This helps suppress non-pertinent light and reduce noise.

In some variations, the image-sensor 202B is configured for operation in a different duty cycle than the array of photodetectors 204.

Figure 3:
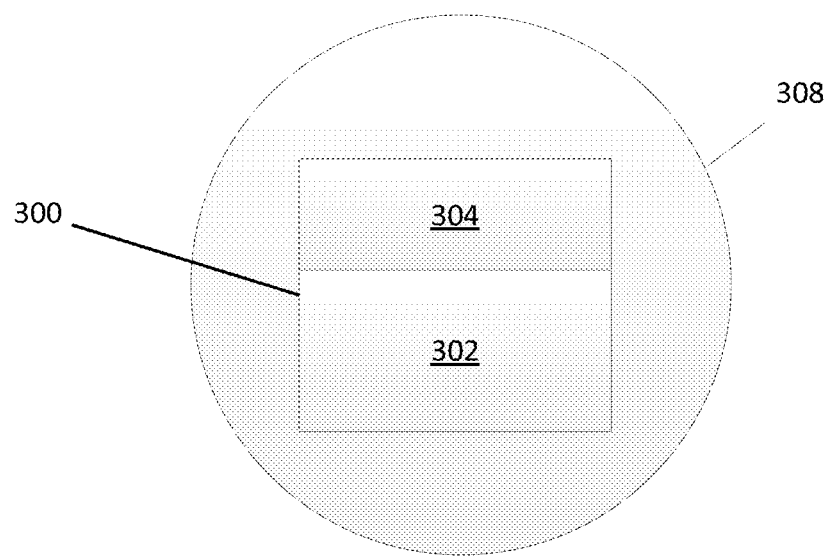
FIG. 3 is a top view of a photosensor including a camera sensor and an on-chip array of photodetectors, in accordance with some aspects of the present technology.

FIG. 3 is a top view of an on-chip solution including a camera sensor and an array of photodetectors in accordance with some aspects of the present technology. As illustrated, an on-chip solution 300 includes a camera sensor chip 302 and an array of photodetectors chip 304 within an optical field 308. The array of photodetectors chip 304 uses the same optical lens as the camera sensor chip 302. The camera sensor or image sensor chip 302 remains its original size as in a regular flash LiDAR sensor, while the array of photodetectors chip 304 is positioned in a free space near the image sensor chip 302. The free space near the image sensor 302 may adopt additional photo-sensing elements 304, which can be used for an optical data pipeline. The additional sensing elements 304 can enable longer-range data transmission. The image sensor chip 302 may include an array of pixels. Each pixel includes a photo-sensitive element (e.g. a photodiode) and converts the incoming light into an electric current.

As illustrated in FIG. 3, the optical field 308 has a circular shape, while the camera sensor chip 302 includes a semiconductor chip (e.g. a silicon die) and has a square shape or a rectangular shape.

The array of photodetectors chip 304 may utilize the same optical components as the image sensor or camera sensor 302, which has a lower cost than an off-shelf solution (illustrated in FIG. 4), as additional hardware or chip is required.

It will be appreciated by those skilled in the art that two or more arrays of photodetector chips may be placed in the free space around the image sensor within the optical field. The two or more arrays of photodetector chips may be configured to transmit and/or receive light having different modulation frequencies or different wavelengths.

In some aspects, multiple transmitters may be coordinated to increase Signal-to-Noise (S/N) ratio for receivers. Multiple LiDARs may be synchronized to increase light intensity to boost signals and expand coverages for ground reflections.

Figure 4:
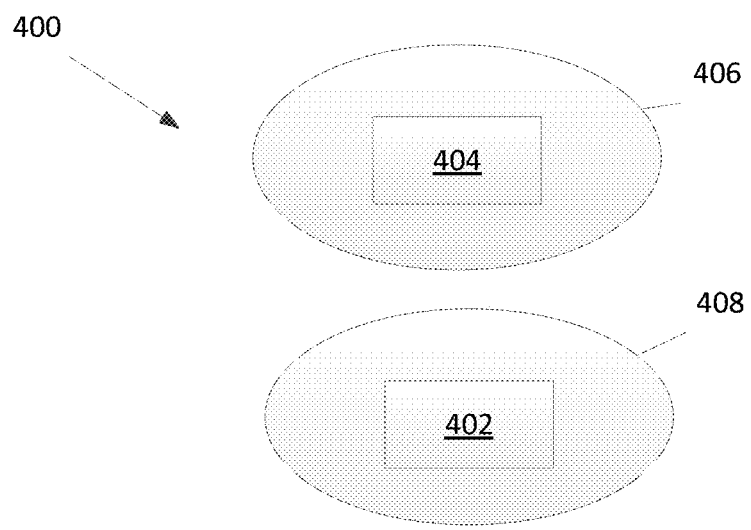
FIG. 4 is a diagram illustrating a photosensor including an off-chip or discrete high-speed photodiode, in accordance with one aspect of the present technology.

FIG. 4 is a diagram illustrating an off-chip solution including a discrete high-speed photodiode for uses in both distance detection and data communication in accordance with one aspect of the present technology. The LiDAR system provides an off-chip solution 400. As illustrated in FIG. 4, the LiDAR system is similar to the LiDAR system 200B except in the form of the array of photodetectors 204. The LiDAR system does not use the on-chip solution 300 including the array of photodetectors in free space within the optical field utilizing the same optical lens, as illustrated in FIG. 3. Instead, the on-chip solution 300 may be replaced with a camera sensing die 402 with a first optical field 408A and a discrete high-speed photodiode sensor 404 with a second optical field 408B. The discrete high-speed photodiode sensor 404 may be an off-shelf product from another supplier and adds more cost than the on-chip solution, as illustrated in FIG. 3.

In another aspect, a common optical data pipeline may be established when an AV is at a charging infrastructure or a stational public location. The AV may offload data to infrastructures when the AV finishes driving. The AV may transfer data via optical signals using LiDAR on the AV to increase data throughput.

Figure 5:
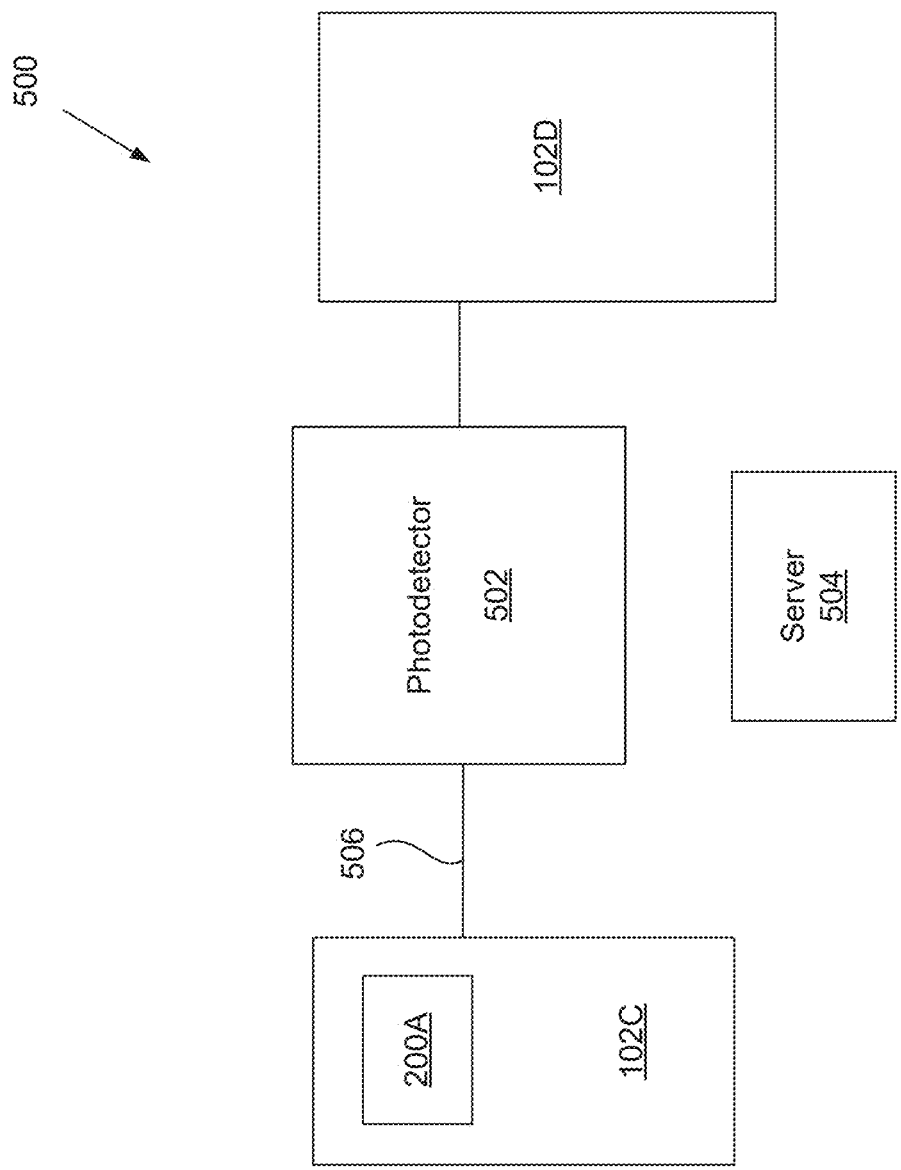
FIG. 5 is a diagram of an example LiDAR system for uses in both distance detection and data communication, in accordance with another aspect of the present technology.

FIG. 5 is a system diagram of a LiDAR system for uses in both distance detection and data communication when the vehicle is in a stationary state in accordance with another aspect of the present technology. As illustrated in FIG. 5, a sensor system 500 includes the LiDAR system 200A which is positioned on an AV 102C in a stationary state. The LiDAR sensor system 500 provides the V2X data communication. When the AV 102C is parked or in a stationary state, a data link 506 can be established between the LiDAR system 200A and a photosensor 502 to offload large amounts of data. The data transfer may occur between the AV 102C and the photodetector 502. The photodetector 502 is used as a receiver to receive the data transfer from the LiDAR system 200A. The photodetector 502 may be coupled to server 504 in a remote location. The photodetector 502 may also be positioned on another AV 102D. The LiDAR sensor system 500 can perform the data transfer from the AV 102C to the server 504 or the AV 102D via the photodetector 502. The communications may happen during the 95% portion of the duty cycle when the system does not make a range measurement (5% of time).

In some variations, the vehicle may be driving rather than in a stationary state. A data link can be established between the LiDAR system on the vehicle and a photosensor to offload large amounts of data.

In some variations, the photodetector 502 may be a high-speed photosensor or a low-speed photodetector depending upon the data throughput.

FIG. 6A is a diagram illustrating an on-chip high-speed photosensor positioned for collecting reflections from a ground in accordance with some aspects of the present technology. As illustrated, a light source (e.g., a laser diode or LED) 602 may emit light through an optical lens 606A placed near the light source 602. Another optical lens 606B may be positioned near a receiver 604 including the image sensor 302 and the on-chip high-speed photodetector or photosensor 304, which are both within the same optical field 308 behind the optical lens 606B. The on-chip high-speed photosensor 304 can collect the lights from the surrounding objects and also lights 610 reflected from a ground surface 612 near an AV. The high-speed photosensor 304 is positioned over a top-edge of the image sensor 302 and configured to receive lights reflected from the ground. The reasons for placing the high-speed photodetector in an upper portion are to collect more light reflected from the ground and to have a higher signal-to-noise ratio (SNR).

FIG. 6B is a diagram illustrating light rays for ranging measurements and free-space optical (FSO) communications in accordance with some aspects of the present technology. As illustrated in FIG. 6B, a first light beam 614 from transmitter 602 in one LiDAR to receiver 604 in another LiDAR is in a different region from a second light beam 616. The second light beam 616 from transmitter 602 for FSO communication is first scattered or reflected off the ground 612, and then is received by receiver 604. The second light beam 616 is focused onto a different region of a focal plane than the first light beam 614 used for ranging measurement.

Also, the light 616 reflected from the ground 612 has large optical ray angles compared to the light 614 used for ranging measurements (i.e., direct rays).

Figure 6C:
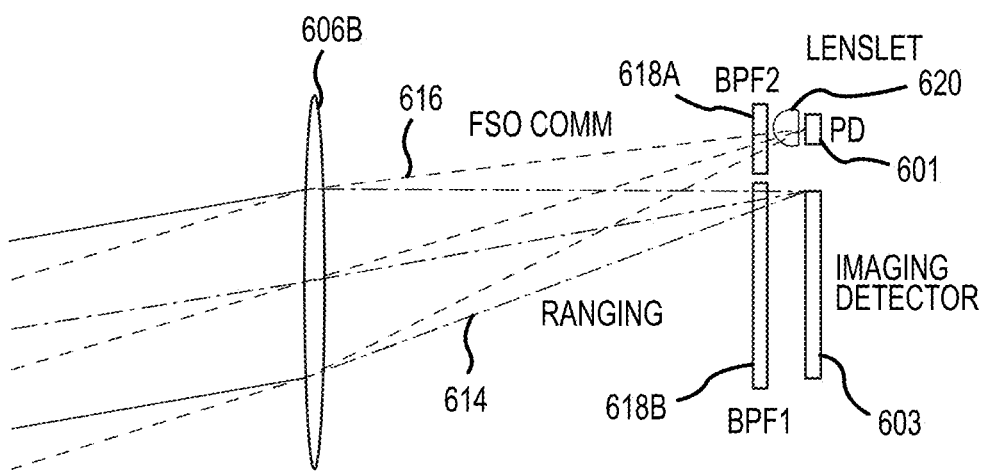
FIG. 6C is a side on-view of lens, photodetector, and focal plane stackup including lenslet and band-pass filter (BPF) in accordance with some aspects of the present technology.

FIG. 6C is a side on-view of lens, photodetector, and focal plane stackup including lenslet and band-pass filter (BPF) in accordance with some aspects of the present technology. The side on-view views the camera (or vehicle) from the side. As illustrated in FIG. 6C, receiver 604 includes a photodetector 601 and an image detector 603, which receives the light rays 614 for ranging measurement. The light 616 is focused into a surrounding region around the image detector or image sensor 603. High-speed photodetectors 601 are placed in the surrounding region for optical communications.

Receiver 604 may also include a lenslet 620 in front of the photodetector 601. The lenslet 620 is a micro-lens, which is used to bend the high angle light rays 616 into the photodetector 601 for FSO communication. The lenslet 620 helps improve collection efficiency.

Receiver 604 may also include a first bandpass filter (BPF) 618A in front of the lenslet 620, which is different from a second BPF 618B in front of the image detector 603. The first BPF 618A is configured to pass a different wavelength band from the second BPF 618B.

The wide field of view and ground reflections, transmitter 602 and receiver 604 do not require precise alignment. Multiple sensors on vehicle can have coverage of 360 degrees. In other words, the angular alignment is less critical due to the large field of view approach compared to other optical transmissions that require precise alignments.

In some variations, the array of photodetectors is configured to receive light signals reflected from a ground surface proximate to the first AV.

In some variations, a first array of photodetectors is disposed along a top-edge of an image sensor of the LiDAR sensor.

The on-chip array of photodetectors or high-speed photosensor 302 is dedicated to data communications among vehicles (V2V) or V2X. Additionally, the array of photodetectors may be positioned on the side-edges of the image sensor 302.

In some variations, a second array of photodetectors may be coupled to the processing unit, where the second array of photodetectors is disposed in the optical field of the optical lens and coupled to at least one side-edge of the image sensor.

LiDAR generally operates under a single wavelength. The disclosure provides systems and methods for adding two or more wavelengths to improve the overall throughput of the optical data pipeline. FIG. 7A is a diagram illustrating a LiDAR system including the array of photodetectors configured to operate at three wavelengths simultaneously in accordance with some aspects of the present technology. For example, a transmitting system or transmitter 700A including optical lens 704 may be configured to transmit lights in two or more wavelengths for increasing throughput. The transmitting system 700A may include three laser diodes to transmit lights at three discrete wavelengths. The receiving system or receiver 700B including optical components 706 may be configured to receive the lights in two or more wavelengths for increasing throughput.

As illustrated in FIG. 7A, the laser diodes 702A-C may emit three discrete wavelengths. The light from the three laser diodes 702A-C travel through an optical lens 704 and then optical components 706 toward the receiving system or receiver 700B including photodetectors or photosensors 700A. 700N for the respective wavelengths.

In some variations, the light source may include filters configured to filter lights at three discrete wavelengths. By using three discrete or different wavelengths or three different frequencies simultaneously, the throughput of the LiDAR system may be tripled. It will be appreciated by those skilled in the art that the number of wavelengths may vary. The throughput increases with the number of wavelengths.

In some variations, the filters of the first array of photodetectors may include coatings over a chip of the array of photodetectors.

FIG. 7B is a top-down view of lens, photodetector, and focal plane stackup illustrating different light beams for ranging measurements and FSO communication in accordance with some aspects of the present technology. The top-down view views the camera (or vehicle) from above the camera (or vehicle). As illustrated in FIG. 7B, transmitter 700A includes laser diodes or LED that emit beams 710A-D transmitted through lens 704. Receiver 700B includes optical lens 706 that focus the light beams 710A-D onto BPFs 718. Light beam 710B represented by a large triangle is used for ranging measurements. Light beams 710A, 710C, and 710D represented by three small triangles correspond to three different wavelengths and can be used for FSO communications. The transmitter 700A can be setup or configured such that the light for FSO communications may be emitted into smaller ranges of angles, which are smaller than the light beam 710B used for ranging measurements. These different wavelengths for FSO communications can be focused on different photodetectors 704A-D with different BPFs 718 and different lenslets 712A-D.

Figure 8:
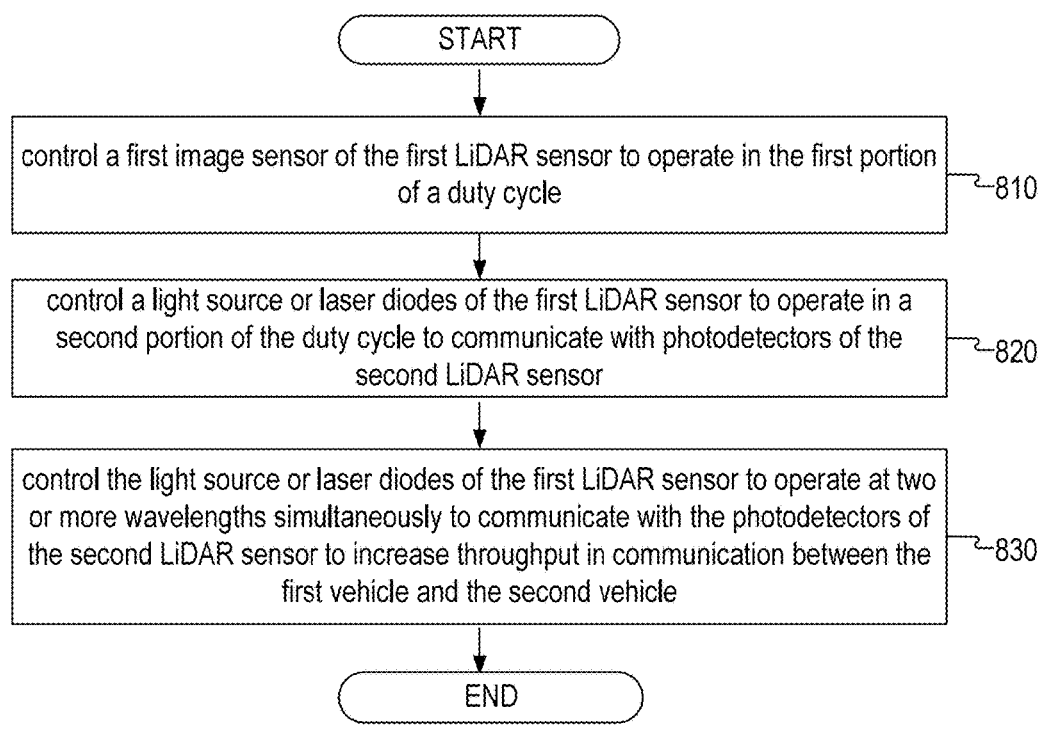
FIG. 8 is a flow chart illustrating steps of an example process of using the LiDAR system of FIGS. 2A-C and FIG. 7, in accordance with one aspect of the present technology.

FIG. 8 is a flow chart illustrating the steps of using the LiDAR system of FIGS. 2A-C and 7 for collecting distance information and data communication in accordance with one aspect of the present technology. Although the example method 800 depicts a particular sequence of operations, the sequence may be altered without departing from the scope of the present disclosure. For example, some of the operations depicted may be performed in parallel or in a different sequence that does not materially affect the function of method 800. In other examples, different components of an example device or system that implements method 800 may perform functions at substantially the same time or in a specific sequence.

According to some examples, method 800 may include controlling the first image sensor of the first LiDAR sensor to operate in the first portion of a duty cycle at block 810. For example, the local computing system 110 illustrated in FIG. 1 may control the first image sensor of the first LiDAR sensor to operate in the first portion of a duty cycle.

According to some examples, method 800 may include controlling the light source or laser diodes to operate in a second portion of the duty cycle to communicate with photodetectors of the second LiDAR sensor, when the first image sensor of the first LiDAR sensor does not operate at block 820. For example, the local computing system 110 illustrated in FIG. 1 may control the first array of photodetectors to operate in a second portion of the duty cycle to communicate with the second LiDAR sensor, when the first image sensor of the first LiDAR sensor does not operate.

According to some examples, method 800 may include controlling the light source or laser diodes of the first LiDAR sensor to operate at two or more wavelengths simultaneously to communicate with the photodetectors of the second LiDAR sensor to increase throughput in communication between the first vehicle and the second vehicle at block 830. For example, the local computing system 110 illustrated in FIG. 1 may operate the light source or transmitters of the first LiDAR sensor at two or more wavelengths simultaneously to communicate with the second LiDAR sensor to increase throughput in communication between the first vehicle and the second vehicle.

In some variations, the first portion may be up to 5%, and the second portion may be equal to 95% and up to 100%.

One example of data communication using the LiDAR system is to transfer timing information among vehicles to establish synchronization and enhance time domain multiplex.

Figure 9:
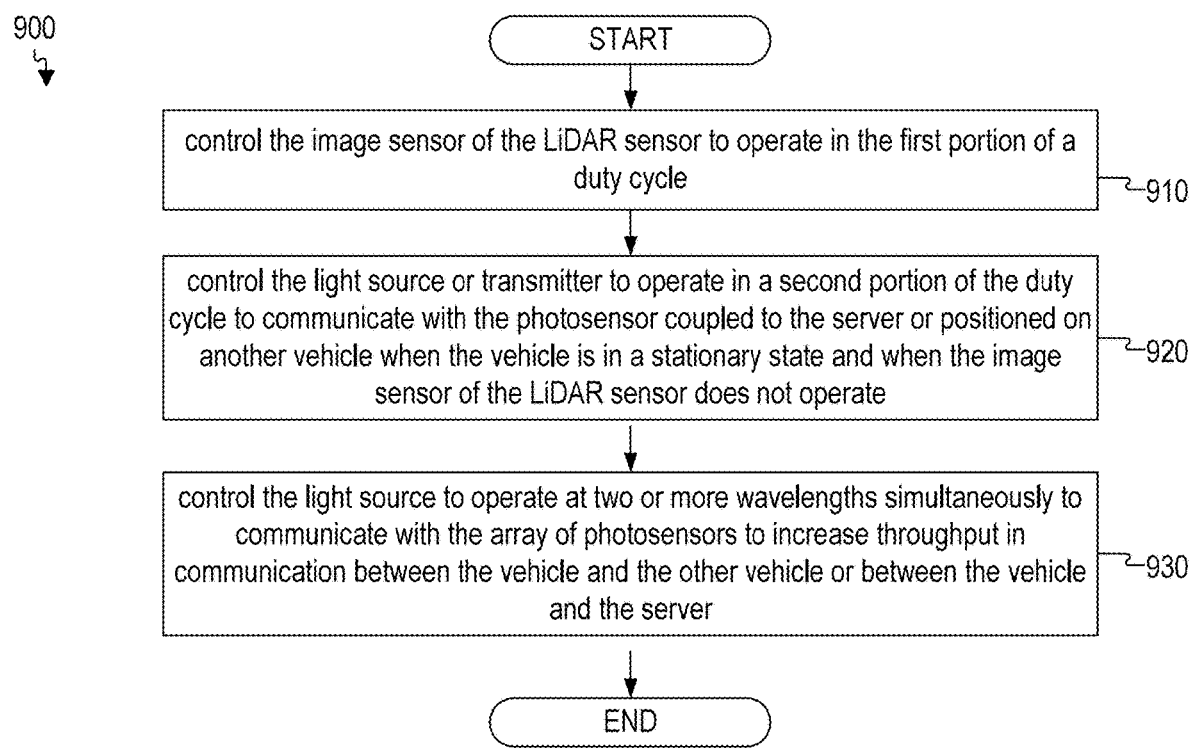
FIG. 9 is a flow chart illustrating steps of an example process of using the LiDAR system of FIG. 5, in accordance with another aspect of the present technology.

FIG. 9 is a flow chart illustrating the steps of using the LiDAR system of FIG. 5 for collecting distance information and data communication in accordance with another aspect of the present technology. Although the example method 900 depicts a particular sequence of operations, the sequence may be altered without departing from the scope of the present disclosure. For example, some of the operations depicted may be performed in parallel or in a different sequence that does not materially affect the function of method 900. In other examples, different components of an example device or system that implements method 900 may perform functions at substantially the same time or in a specific sequence.

According to some examples, the method includes controlling the image sensor of the LiDAR sensor to operate in the first portion of a duty cycle at block 910. For example, the local computing system 110 illustrated in FIG. 1 may control the image sensor of the LiDAR sensor to operate in the first portion of a duty cycle.

According to some examples, method 900 may include controlling the light source or transmitter to operate in a second portion of the duty cycle to communicate with the photosensor or photodetector coupled to the server or positioned on another vehicle when the vehicle is in a stationary state and when the image sensor of the LiDAR sensor does not operate at block 920. For example, the local computing system 110 illustrated in FIG. 1 may control the light source or transmitter to operate in a second portion of the duty cycle to communicate with the photosensor coupled to the server or positioned on another vehicle when the vehicle is in a stationary state and when the image sensor of the LiDAR sensor does not operate.

According to some examples, method 900 may include controlling the light sources to operate at two or more wavelengths simultaneously to communicate with the photosensors to increase throughput in communication between the vehicle and the other vehicle or between the vehicle and the server at block 930. For example, the local computing system 110 illustrated in FIG. 1 may control the light sources to operate at two or more wavelengths simultaneously to communicate with the photosensor to increase throughput in communication between the vehicle and the other vehicle or between the vehicle and the server.

Figure 10:
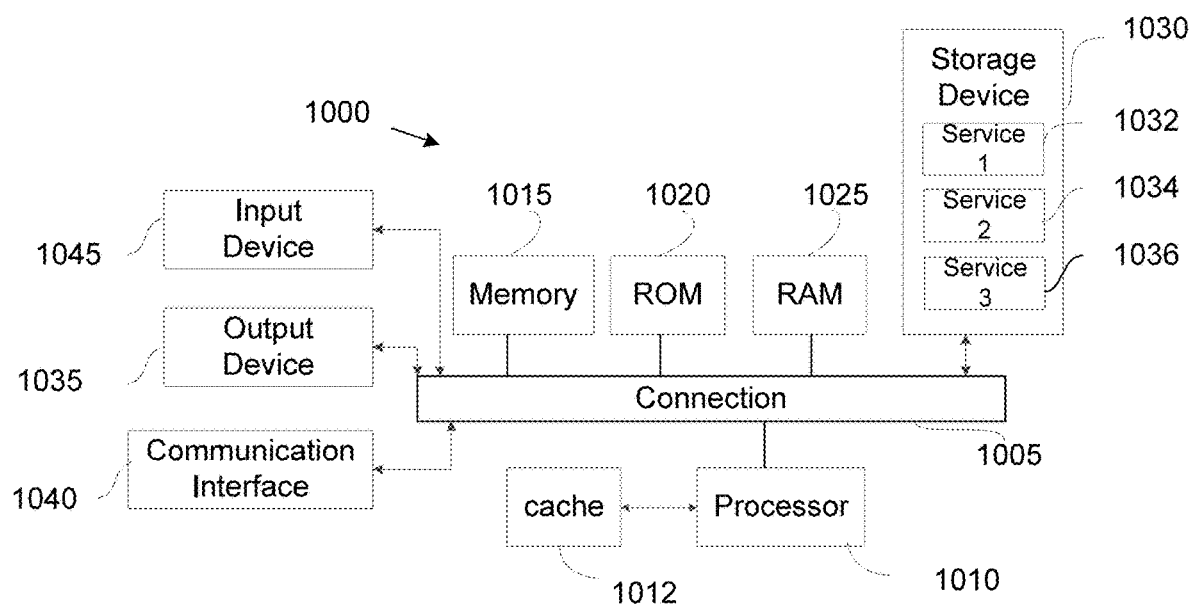
FIG. 10 shows an example of a computing system for implementing certain aspects of the present technology.

FIG. 10 shows an example of computing system 1000, which can be, for example, used for all the calculations as discussed above, or can be any computing device making up the local computing system 110, remote computing system 150, (potential) passenger device executing rideshare app 170, or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement, and therefore the basic features here may easily be substituted for improved hardware or firmware arrangements as they are developed.

Storage device 1030 can be a non-volatile memory device and can be a hard disk or other types of computer-readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A Light Detection and Ranging (LiDAR) system, comprising:
   a processing unit;
   an image-sensor coupled to the processing unit, the image-sensor disposed in an optical field of an optical lens; and
   a first array of photodetectors coupled to the processing unit, wherein the first array of photodetectors is disposed in the optical field of the optical lens and coupled to a top-edge of the image-sensor, wherein the first array of photodetectors receives optical communication signals reflected from a ground surface, and wherein an integration rate for light signals received by the first array of photodetectors is faster than an integration rate for light signals received by the image-sensor.

2. The LiDAR system of claim 1, wherein the processing unit is configured to decode Vehicle-to-Everything (V2X) communications received via the first array of photodetectors.

3. The LiDAR system of claim 1, further comprising:
   a light-source coupled to the processing unit, and wherein the processing unit is configured to encode Vehicle-to-Everything (V2X) communications for transmission via the light-source.

4. The LiDAR system of claim 3, wherein the light-source comprises at least one laser.

5. The LiDAR system of claim 1, wherein the image-sensor is configured for operation in a different duty cycle than the first array of photodetectors.

6. The LiDAR system of claim 1, further comprising a second array of photodetectors coupled to the processing unit, wherein the second array of photodetectors is disposed in the optical field of the optical lens and coupled to at least one side-edge of the image-sensor.

7. The LiDAR system of claim 1, wherein the LiDAR system is mounted to an autonomous vehicle (AV).

8. An autonomous vehicle (AV), comprising:
   a Light Detection and Ranging (LiDAR) sensor mounted to at least one surface of the AV, wherein the LiDAR sensor is configured for Vehicle-to-Everything communications with at least one other vehicle, the LiDAR sensor comprising:
   a processing unit;
   an image-sensor coupled to the processing unit, the image-sensor disposed in an optical field of an optical lens; and
   a first array of photodetectors coupled to the processing unit, wherein the first array of photodetectors is disposed in the optical field of the optical lens and coupled to a top-edge of the image-sensor, wherein the first array of photodetectors receives optical communication signals reflected from a ground surface, and wherein an integration rate for light signals received by the first array of photodetectors is faster than an integration rate for light signals received by the image-sensor.

9. The AV of claim 8, wherein the processing unit is configured to decode light-based Vehicle-to-Everything (V2X) communications received via the first array of photodetectors.

10. The AV of claim 8, wherein the LiDAR sensor further comprises:
    a light-source coupled to the processing unit, and wherein the processing unit is configured to encode Vehicle-to-Everything (V2X) communications for transmission via the light-source.

11. The AV of claim 10, wherein the light-source comprises at least one laser.

12. The AV of claim 8, wherein the image-sensor is configured for operation in a different duty cycle than the first array of photodetectors.

13. The AV of claim 8, further comprising a second array of photodetectors coupled to the processing unit, wherein the second array of photodetectors is disposed in the optical field of the optical lens and coupled to at least one side-edge of the image-sensor.

14. The AV of claim 8, wherein the LiDAR sensor is mounted to a roof of the AV.

15. A communication system, comprising:
    a first autonomous vehicle (AV) comprising a first Light Detection and Ranging (LiDAR) sensor configured for optical V2X communications, the first LiDAR sensor comprising:
    an image-sensor; and
    a first array of photodetectors coupled to a top-edge of the image-sensor, wherein the first array of photodetectors receives optical communication signals reflected from a ground surface;
    a second autonomous vehicle (AV) comprising a second Light Detection and Ranging (LiDAR) sensor configured for optical V2X communications, and
    wherein the first AV is configured to receive one or more optical V2X messages from the second AV via the first array of photodetectors disposed within the first LiDAR sensor.

16. The communication system of claim 15, wherein the first LiDAR sensor further comprises a second array of photodetectors coupled to at least one side-edge of the image-sensor of the first LiDAR sensor.

17. The communication system of claim 15, wherein the ground surface is proximate to the first AV.

18. The communication system of claim 15, wherein the first array of photodetectors is disposed in an optical field of an optical lens.

19. The communication system of claim 15, wherein the first array of photodetectors is configured to integrate the optical communication signals at a faster rate than the image-sensor of the first LiDAR sensor.

20. The communication system of claim 15, wherein the first LiDAR sensor is mounted to a roof of the first AV and the second LiDAR sensor is mounted to a roof of the second AV.

* * * * *